(12) United States Patent
Lee et al.

(10) Patent No.: US 11,190,806 B2
(45) Date of Patent: Nov. 30, 2021

(54) DISPLAY APPARATUS AND METHOD OF CONTROLLING THEREOF

(71) Applicant: SAMSUNG ELECTRONICS CO., LTD., Suwon-si (KR)

(72) Inventors: Jaecheol Lee, Suwon-si (KR); Haejong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/985,370

(22) Filed: Aug. 5, 2020

(65) Prior Publication Data

US 2021/0076071 A1    Mar. 11, 2021

(30) Foreign Application Priority Data

Sep. 5, 2019   (KR) .................. 10-2019-0109971

(51) Int. Cl.
*H04N 19/68* (2014.01)
*G06F 3/0481* (2013.01)
*H04N 19/44* (2014.01)

(52) U.S. Cl.
CPC ......... *H04N 19/68* (2014.11); *G06F 3/04817* (2013.01); *H04N 19/44* (2014.11)

(58) Field of Classification Search
CPC .... H04N 19/68; H04N 19/44; H04N 21/4307; H04N 21/4852; H04N 21/2335; H04N 21/8547; G06F 3/04817; G09G 2370/02
(Continued)

(56) References Cited

U.S. PATENT DOCUMENTS 5,808,722 A * 9/1998 Suzuki ................... G03B 31/04
                                                          348/515
6,005,633 A * 12/1999 Kosugi .................... H04N 7/14
                                                          348/14.02
(Continued)

FOREIGN PATENT DOCUMENTS

CN    109963186 A     7/2019
JP    2004-320424 A   11/2004
(Continued)

OTHER PUBLICATIONS

Written Opinion (PCT/ISA/237) issued by the International Searching Authority in corresponding International Application No. PCT/KR2020/010734, dated Nov. 17, 2020.
(Continued)

*Primary Examiner* — Tung T Vo
(74) *Attorney, Agent, or Firm* — Sughrue Mion, PLLC

(57) ABSTRACT

A display apparatus is disclosed. The display apparatus includes a display, a communication interface, a receiver, and a processor configured to decode an encoded video frame and an encoded audio frame, received through the receiver, transmit information on decoding time of the decoded video frame to an audio apparatus through the communication interface, delay the decoded audio frame by a first time, and transmit information on decoding time of the decoded audio frame, information on the first time, and an audio frame delayed by the first time to the audio apparatus through the communication interface, in response to the transmission, receive information on a second time delayed in the audio apparatus to output the audio frame from the audio apparatus through the communication interface, and synchronize an audio frame output from the audio apparatus with a video frame output through the display based on the information on the second time.

18 Claims, 9 Drawing Sheets

(58) Field of Classification Search
USPC .................................................. 375/240.25
See application file for complete search history.

(56) References Cited

U.S. PATENT DOCUMENTS

| | | | |
|---|---|---|---|
| 6,122,619 A * | 9/2000 | Kolluru | G10L 19/008 704/270 |
| 7,924,929 B2 | 4/2011 | Meenakshisundaram et al. | |
| 8,111,759 B2 | 2/2012 | Winter et al. | |
| 8,199,780 B2 | 6/2012 | Gha et al. | |
| 8,441,576 B2 | 5/2013 | Nakajima et al. | |
| 8,811,375 B2 | 8/2014 | Gha et al. | |
| 9,819,839 B2 | 11/2017 | Matsuo | |
| 2004/0047611 A1 | 3/2004 | Hayashibara | |
| 2008/0232784 A1 | 9/2008 | Herpel et al. | |
| 2009/0091655 A1 | 4/2009 | Russell et al. | |
| 2009/0135856 A1 | 5/2009 | Gha et al. | |
| 2012/0133829 A1 | 5/2012 | Nakade | |
| 2012/0224100 A1 | 9/2012 | Gha et al. | |
| 2015/0077633 A1 | 3/2015 | Lee et al. | |
| 2016/0294912 A1 | 10/2016 | Lee et al. | |
| 2017/0026686 A1 | 1/2017 | Glazier et al. | |

FOREIGN PATENT DOCUMENTS

| | | |
|---|---|---|
| JP | 2012119924 A | 6/2012 |
| KR | 10-0677162 B1 | 2/2007 |
| KR | 20100060717 A | 6/2010 |
| KR | 101450100 B1 | 10/2014 |

OTHER PUBLICATIONS

International Search Report (PCT/ISA/210), issued by International Searching Authority in corresponding International Application No. PCT/KR2020/010734, dated Nov. 17, 2020.

\* cited by examiner

DISPLAY APPARATUS AND METHOD OF CONTROLLING THEREOF

CROSS-REFERENCE TO RELATED APPLICATION(S)

This application is based on and claims priority under 35 U.S.C. § 119 to Korean Patent Application No. 10-2019-0109971, filed on Sep. 5, 2019, in the Korean Intellectual Property Office, the disclosure of which is incorporated by reference herein in its entirety.

BACKGROUND

1. Field

The disclosure relates to a display apparatus and a control method thereof. More particularly, the disclosure relates to a display apparatus capable of outputting an audio frame through an audio apparatus and a control method thereof.

2. Description of Related Art

With the development of electronics technologies, various types of electronic apparatuses have been developed. Particularly, a display apparatus capable of outputting an audio frame through an audio apparatus has been developed.

The audio apparatus is a separate external device that is distinct from the display apparatus, and outputs an audio frame received from the display apparatus.

The time taken to decode and output a video frame from the display apparatus is generally longer than the time taken to decode and output an audio frame from the audio apparatus. Alternatively, if the display apparatus outputs a low-quality image, the time taken to decode and output the video frame from the display apparatus may be shorter than the time taken to decode and output the audio frame from the audio apparatus. As such, when the time taken to decode and output the video frame from the display apparatus is different from the time taken to decode and output the audio frame from the audio apparatus, it may need to synchronize the video frame outputted from the display apparatus and the audio frame outputted from the audio apparatus.

A conventional display apparatus and/or an audio apparatus has provided a function for a user to arbitrarily delay an audio frame output time of the audio apparatus in order to synchronize video frames output from the display apparatus and audio frames output from the audio apparatus. However, it is difficult to accurately synchronize video frames and audio frames through the method above and causes user inconvenience.

SUMMARY

In accordance with an aspect of the disclosure, a display apparatus includes a display, a communication interface, a receiver, and a processor configured to decode an encoded video frame and an encoded audio frame, received through the receiver, transmit information on decoding time of the decoded video frame to an audio apparatus through the communication interface, delay the decoded audio frame by a first time, and transmit information on decoding time of the decoded audio frame, information on the first time, and an audio frame delayed by the first time to the audio apparatus through the communication interface, in response to the transmission, receive information on a second time delayed in the audio apparatus to output the audio frame from the audio apparatus through the communication interface, and synchronize an audio frame output from the audio apparatus with a video frame output through the display based on the information on the second time.

In accordance with an aspect of the disclosure, a method of controlling a display apparatus includes decoding an encoded video frame and an encoded audio frame, transmitting information on decoding time of the decoded video frame to an audio apparatus, delaying the decoded audio frame by a first time, and transmitting information on decoding time of the decoded audio frame, information on the first time, and an audio frame delayed by the first time to the audio apparatus, in response to the transmission, receiving information on a second time delayed in the audio apparatus to output the audio frame from the audio apparatus, and synchronizing an audio frame output from the audio apparatus with a video frame output through the display based on the information on the second time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Furthermore, certain exemplary embodiments will now be explained in detail with reference to the accompanying drawings, but it is not limited thereto by the embodiments.

Hereinafter, certain exemplary embodiments will now be explained in detail with reference to the accompanying drawings.

An object of the disclosure is to provide a display apparatus that automatically synchronizes a video frame output from a display apparatus and an audio frame output from an audio apparatus, and a method of controlling thereof.

Figure 1:
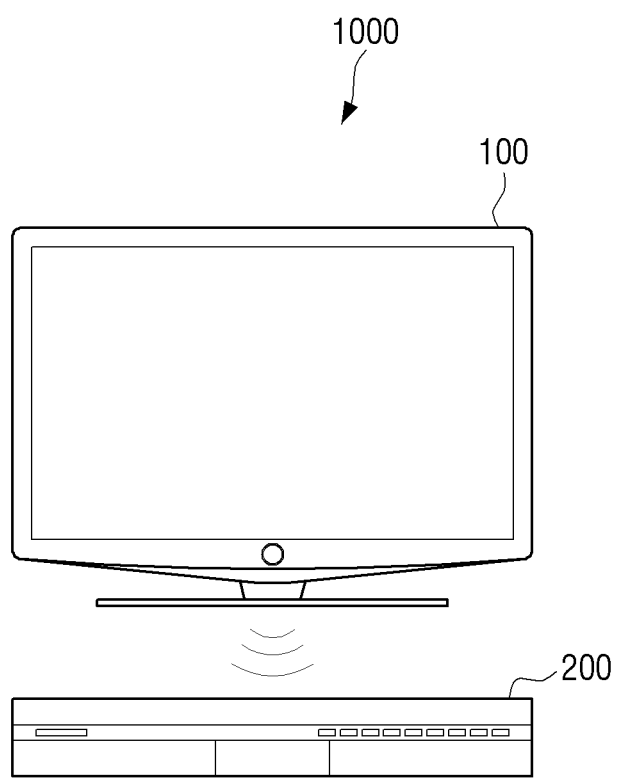
FIG. 1 is a view illustrating an electronic system including a display apparatus and an audio apparatus according to an embodiment.

FIG. 1 is a view illustrating a display system including a display apparatus and an audio apparatus according to an embodiment.

Referring to FIG. 1, an electronic system 1000 according to an embodiment includes a display apparatus 100 and an audio apparatus 200.

The display apparatus 100 according to an embodiment may be a smart TV. However, this is only an example, and the display apparatus 100 may be various electronic devices having a display, such as a TV, computer, laptop, tablet, PDA, smart phone, or the like.

The display apparatus 100 may display various images. As an example, the display apparatus 100 may display an image based on pre-stored image data, as well as display an image based on image data received from an external device. The external device may be various electronic devices capable of transmitting image data, such as a server, a computer, a laptop, and a smart phone, or the like to the display apparatus 100.

For this operation, the display apparatus 100 may perform signal processing on image data. Specifically, the display apparatus 100 may demultiplex the image data into video frames and audio frames through a demultiplexer (demux), and may decode video frames and audio frames separated by demultiplexing.

Then, the display apparatus 100 may output a decoded video frame through a display, and output a decoded audio frame through a speaker. According to an embodiment, the decoded audio frame may be output by going through a digital/analog (D/A) converter and a low-frequency amplifier through the speaker The audio frame may be output through the speaker of the display apparatus 100 as well as output through the speaker of the audio apparatus 200. In other words, the audio frame may be output through at least one of the speaker of the display apparatus 100 and the speaker of the audio apparatus 200. The audio apparatus 200 may be a sound bar, as illustrated in FIG. 1, but is not limited thereto. For example, the audio apparatus 200 may be a variety of electronic devices having a speaker, such as computers, laptops, tablets, PDAs, smart phones, or the like. Also, although one audio apparatus 200 is illustrated in FIG. 1, a plurality of audio apparatuses 200 may be implemented according to an embodiment.

For this operation, the display apparatus 100 may encode (or re-encode) the audio frame separated by demultiplexing. Then, the display apparatus 100 may transmit the encoded audio frame to the audio apparatus 200. Specifically, the display apparatus 100 may be coupled to the audio apparatus 200 through a wired cable such as an optical cable, a high-definition multimedia interface (HDMI) cable, or the like, and may transmit an audio frame encoded through the wired cable to the audio apparatus 200. The display apparatus 100 may transmit the encoded audio frame to the audio apparatus 200 through various wireless communication methods, such as Bluetooth (BT), Bluetooth Low Energy (BLE), Wireless Fidelity (WI-FI), Wireless Fidelity Direct (WI-FI Direct), Zigbee, or the like.

The audio apparatus 200 may decode the encoded audio frame received from the display apparatus 100. The decoding may be performed according to a Moving Picture Experts Group (MPEG) standard, but is not limited thereto. According to an embodiment, the audio apparatus 200 may decode the encoded audio frame received from the display apparatus 100 through various codecs such as MP3, AAC, MP4, AC3, or the like.

The audio apparatus 200 may output the decoded audio frame through the speaker of the audio apparatus 200. Specifically, the audio apparatus 200 may output an audio frame, converted to an analog signal through the D/A converter, through a speaker. According to an embodiment, the audio apparatus 200 may amplify an audio frame converted into an analog signal through an amplifier, and output it through a speaker.

The audio frame output by the audio apparatus 200 might not match its synchronization with the video frame output from the display apparatus 100. This is because the time until the encoded video frame is decoded and output by the display apparatus 100 and the time until the encoded audio frame is decoded and output by the audio apparatus 200 do not match.

Accordingly, it is necessary to synchronize the video output from the display apparatus and the sound output from the audio apparatus. A conventional display apparatus transmits an audio frame in which output time is delayed as much as a difference between a time for decoding the video frame and a time for decoding the audio frame in the display apparatus in order to synchronize the video frame output from the display apparatus and the audio frame output from the audio apparatus.

However, since the time during which the audio frame is transmitted from the display apparatus to the audio apparatus is not considered, it has a problem that the audio frame output from the audio apparatus is delayed rather than the video frame output from the display apparatus.

A conventional display apparatus transmits an audio frame in which an output time is not delayed to an audio apparatus, and provides a function in which a user can arbitrarily delay the audio frame output time of the audio apparatus. However, it is difficult to accurately synchronize the video frame output from the display apparatus and the audio frame output from the audio apparatus, and may cause user inconvenience. In addition, even if the video frame and the audio frame are synchronized according to the user operation, decoding time of the video frame may be changed in real time according to a mode of the display apparatus or an image quality of the video data, so that the user may be inconvenient in delaying the audio frame output time of the audio apparatus again when the mode of the display apparatus is changed or when an image quality of the video data is changed. For example, when the mode of the display apparatus is changed from a first mode (e.g., low resolution mode, game mode, etc.) to a second mode (e.g., high-definition mode, watching movie mode, etc.), a decoding speed of the video frame may be relatively slowly changed, and the user may be inconvenient to reset the delay time of the audio frame output set for the first mode to match the second mode.

In order to resolve the problem above, synchronization of the video frame output from the display apparatus 100 and the audio frame output from the audio apparatus 200 is automatically operated or is operated with minimal user operation. Hereinafter, this will be described in greater detail below.

Figure 2:
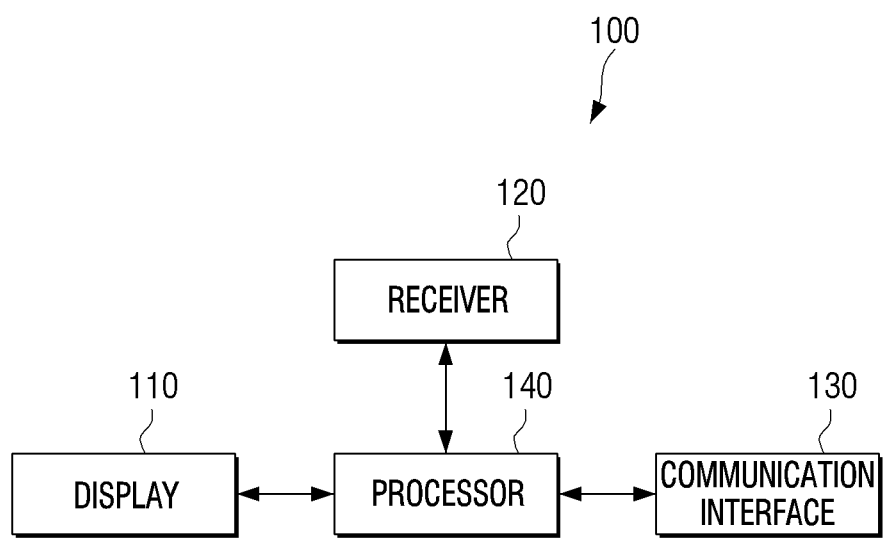
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 according to an embodiment includes a display 110, a receiver 120, a communication interface (e.g., including communication circuitry) 130, and a processor 140.

The display 110 may display various images. For example, the display 110 may display an image based on pre-stored image data, as well as display an image based on image data received from an external device. The external device may refer to various electronic devices capable of transmitting image data such as a server, a computer, a laptop, a smartphone, a universal serial bus (USB) memory, or the like to the display apparatus 100.

As the image includes at least one of a still image or a video, and the display 110 may display various images such as broadcasting contents, multimedia contents, or the like. Further, the display 110 may display various user interfaces (UIs) and icons.

The display 110 may be realized as various kinds of displays, such as Liquid Crystal Display (LCD), Organic Light-Emitting Diode (OLED), Liquid Crystal on Silicon (LCoS), Digital Light Processing (DLP), or the like. Further, the display 110 may further include a driving circuit that may be implemented in the form of an amorphous silicon (a-si) thin-film transistor (TFT), a low temperature poly silicon (LTSP) TFT, or an organic TFT (OTFT), and a backlight unit.

The display 110 may be realized as a touch screen including a touch sensor. The touch screen may sense a touch input through various methods such as a capacitive overlay, a pressure type, a resistive overlay, an infrared beam, or the like.

The receiver 120 may receive various broadcasting contents. The data may be received from an external device such as a server, computer, laptop, smartphone, set-top box, USB memory, or may be received from a storage of the display apparatus 100. For this operation, the receiver 120 may include an HDMI input terminal, a component input terminal, an RGB terminal, a DVI terminal, a DP terminal, a Thunderbolt terminal, a tuner terminal, a USB input terminal, or the like.

The receiver 120 may receive an encoded video frame and audio frame. For example, the receiver 120 may receive the encoded video frame and audio frame multiplexed by a multiplexer (MUX). The multiplexing may be performed by a multiplexer of an external device as well as a multiplexer of the display apparatus.

The type of encoding is not limited to any one of them. For example, the receiver 120 may receive a video frame encoded by a method of MPEG, DivX or WMV and an audio frame encoded by a method of MP3, AAC, MP4 or AC3.

The communication interface 130 may transmit and receive various data by performing communication with an external device.

For example, the communication interface 130 may perform communication with the audio apparatus through various communication methods such as Bluetooth (BT), Bluetooth Low Energy (BLE), Wireless Fidelity (Wi-Fi), Wi-Fi direct, Zigbee, etc. In addition, the communication interface 130 may also communicate with various external devices through a local area network (LAN), an Internet network, and a mobile communication network. For this operation, the communication interface 130 may include various communication modules to perform network communication. For example, the communication interface 130 may include a Wi-Fi chip, a Bluetooth chip, a wireless communication chip, or the like.

In addition, the communication interface 130 may be connected to the audio apparatus 200 through an HDMI cable, an optical cable, or the like, and perform communication with the audio apparatus 200.

The communication interface 130 may communicate with the audio apparatus 200 to transmit and receive various information for synchronization of a video frame output through the display 110 and an audio frame output from the audio apparatus 200.

For example, the communication interface 130 may transmit information on time taken to decode the encoded video frame, information on time taken to decode the encoded audio frame, and information on the delayed audio frame by the first time and the first time to the audio apparatus 200. In addition, the communication interface 130 may receive information on a second time delayed from the audio apparatus 200 in order to output an audio frame from the audio apparatus 200. The information on the second time may include information on time required for the audio frame delayed by the first time to be transmitted from the display apparatus 100 to the audio apparatus 200, information on time required for the audio frame transmitted from the display apparatus 100 to be decoded by the audio apparatus 200, and information on time delayed by an audio delay unit of the audio apparatus 200. A detailed description thereof will be described in greater detail in the description of an operation of the processor 140 below.

The communication interface 130 may communicate with the audio apparatus 200 to transmit and receive control commands to and from the audio apparatus 200. The control command may refer to a user command input to the display apparatus 100 to control the audio apparatus 200. For example, when a user command for adjusting the audio frame output time of the audio apparatus 200 is received, the communication interface 130 may transmit a signal for adjusting the audio frame output time of the audio apparatus 200 based on the user command to the audio apparatus 200.

The processor 140 may control overall operations of the display apparatus 100. The processor 140 may include one or more of a central processing unit (CPU), application processor (AP) and communication processor (CP).

The processor 140 may, for example, control a number of hardware or software elements connected to the processor 140 by driving an operating system or application program, and perform various data processing and calculations. Further, the processor 140 may load and process a command or data received from at least one of the other components to a volatile memory and store diverse data in a non-volatile memory.

The processor 140 may control the receiver 120 to receive data. For example, when a user command for playing a video is received, the processor 140 may control the receiver 120 to receive image data from an external device such as a server or the like, or control the receiver 120 to receive (or read) image data stored in a storage from a storage. The data received by the receiver 120 may include an encoded video frame and an audio frame. In other words, the data received by the receiver 120 may refer to multiplexed encoded video frames and audio frames.

The processor 140 may separate the received data through the receiver 120. For example, the processor 140 may demultiplex the data received through the demultiplexer into encoded video frames and audio frames, thereby separating the data into encoded video frames and audio frames. According to an embodiment, the processor 140 may additionally separate additional information included in the data, but a description thereof will be omitted.

The processor 140 may decode encoded video frames and audio frames. For example, the processor 140 may decode a video frame encoded through a video decoder. Alternatively, the processor 140 may identify a codec for decoding a video frame encoded based on an encoding format, and decode a video frame encoded in a software using corresponding codec. The processor 140 may decode an audio frame encoded through an audio decode. Alternatively, the processor 140 may identify a codec for decoding an audio frame encoded based on the encoding format, and decode an audio frame encoded in a software using corresponding codec. Hereinafter, for convenience of description, it is assumed that the encoded video frame is decoded by a video decoder, and the encoded audio frame is decoded by an audio decoder.

The processor 140 may identify decoding time of the decoded video frame. In other words, the processor 140 may identify time during which the encoded video frame is decoded by a video decoder. For example, the processor 140 may identify time during which the encoded video frame is decoded by a video decoder from time during which the video frame encoded in the video decoder, based on time at which the video frame decoded from the video decoder is outputted.

In addition, the processor 140 may identify decoding time of the decoded audio frame. In other words, the processor 140 may identify time during which the encoded audio frame is decoded by an audio decoder. For example, the processor 140 may identify time during which the encoded audio frame is decoded by an audio decoder from time during which the audio frame encoded in the audio decoder, based on time at which the audio frame decoded from the audio decoder is received.

The processor 140 may delay the decoded audio frame by a first time. The first time may be preset in a product manufacturing phase, and also may be determined based on the time during which the encoded video frame is decoded and the time the encoded audio frame is decoded. For example, the processor 140 may determine a random value among values less than the difference in time between the time during which the encoded video frame is decoded and the time during which the encoded audio frame is decoded as a first time. For example, if the time during which the encoded video frame is decoded is 10 seconds, and the time during which the encoded audio frame is decoded is 5 seconds, the processor 140 may determine one second or the like as the first time.

The processor 140 may transmit information on the decoding time of the decoded video frame, information on the decoding time of the decoded audio frame, and information on the first time to the audio apparatus 200 through the communication interface 130.

The processor 140 may transmit an audio frame delayed by the first time to the audio apparatus 200 through the communication interface 130. For example, the processor 140 may delay the decoded audio frame by the first time, and encode the audio frame delayed by the first time and transmit it to the audio apparatus 200. To achieve this, the display apparatus 100 may further include an audio encoder to encode an audio frame.

The encoded audio frame transmitted to the audio apparatus 200 may include information on the start of encoding. For example, the processor 140 may timestamp information on the start time of encoding of the audio frame delayed by the first time to the encoded audio frame, and transmit the encoded audio frame including the timestamp. to the audio apparatus 200.

The audio apparatus 200 may output an audio frame in synchronization with a video frame outputted from the display apparatus 100 based on information on decoding time of the video frame received from the display apparatus 100, information on decoding time of the audio frame, information on the first time, and the audio frame delayed by the first time.

For example, when the audio frame delayed by the first time is received from the display apparatus 100, the audio apparatus 200 may identify a time during which the audio frame delayed by the first time is transmitted from the display apparatus 100 to the audio apparatus 200 based on the timestamp included in the audio frame and the time when the audio frame is transmitted to the audio apparatus 200. For example, the audio apparatus 200 may identify the time during which the audio frame delayed by the first time is transmitted from the display apparatus 100 to the audio apparatus 200 as one second, when the time identified based on the timestamp included in the audio frame is 00 hours 00 minutes 00 seconds, and the audio frame delayed by the first time from the display apparatus 100 is 00 hours 00 minutes 01 seconds.

The audio apparatus 200 may decode the audio frame delayed by the first time through the audio decoder, and identify the time during which the audio frame delayed by the first time by the audio decoder is decoded. For example, the audio apparatus 200 may identify the time during which the audio frame delayed by the first time by the audio decoder is 2 seconds, if the time when the audio frame delayed by the first time by the audio decoder is transmitted is 00 hours 00 minutes 01 seconds and the time when the audio frame decoded by the audio decoder is 00 hours 00 minutes 03 seconds.

The audio apparatus 200 may additionally delay the audio frame delayed by the first time by a third time, based on the information on the decoding time of the video frame received from the display apparatus 100. Here, the third time may be a time for synchronizing the video frame output through the display of the display apparatus 100 and the audio frame output through the speaker of the audio apparatus 200.

For example, if time taken to decode a video frame in which the display apparatus is encoded is 10 seconds, time taken to decode an audio frame in which the display apparatus is encoded is five seconds, the first time is one second, time taken to transmit the audio frame delayed by the first time from the display apparatus to the audio apparatus 200 is one second, and time taken to decode the audio frame transmitted from the display apparatus by the audio apparatus 200 is two seconds, the audio apparatus 200 may further delay one second to the audio frame delayed by the first time in order to output the audio frame synchronized to 10 seconds, which is the decoding time of the video frame. The one second further delayed may be referred to as the third time described above.

In other words, the audio apparatus 200 may output an audio frame further delayed by the third time, and synchronize the video frame outputted through the display 110 and the audio frame outputted from the audio apparatus 200 in further consideration of not only time taken to decode the audio frame from the display apparatus 100 and the first time but also time taken to transmit the audio frame delayed by the first time to the audio apparatus 200 and time taken to decode the audio frame from the audio apparatus 200.

A total time (four seconds as described in the embodiment above) taken to transmit the audio frame delayed by the first time to the audio apparatus 200, the time taken to decode the audio frame from the audio apparatus 200, and the third time further delayed may be referred to as time delayed from the audio apparatus 200 to output the audio frame. Hereinafter, the delayed time in the audio apparatus 200 to output the audio frame will be described as a second time.

In other words, when the audio frame delayed by the first time is received from the display apparatus 100, the audio apparatus 200 may output an audio frame delayed by the second time, thereby synchronizing the video frame outputted through the display and the audio frame outputted from the audio apparatus 200.

The processor 140 may receive information on the second time from the audio apparatus 200 through the communication interface 130 in response to information on decoding time of the decoded video frame, information on decoding time of the decoded audio frame, information on the first time, and transmission of the audio frame delayed by the first time.

As described above, the information on the second time may include information on the delayed time in the audio apparatus 200 to output the audio frame.

For example, the information on the second time may include the time taken to transmit the audio frame delayed by the first time from the display apparatus 100 to the audio apparatus 200, the time taken to decode the audio frame transmitted from the display apparatus 100 by the audio apparatus 200, and the information on the time delayed by an audio delay unit of the audio apparatus 200. The time delayed by the audio delay unit of the audio apparatus 200 may refer to the third time described above.

When the information on the second time is received from the audio apparatus 200, the processor 140 may additionally delay the audio frame delayed by the first time by the second time, and output the audio frame further delayed by the second time through a speaker of the display apparatus 100.

Accordingly, the video frame outputted from the display 110 of the display apparatus 100, an audio frame outputted from the speaker of the display apparatus 100, and an audio frame outputted from the speaker of the audio apparatus 200 may be synchronized.

When the synchronization between the audio frame outputted from the audio apparatus 200 and the video frame outputted through the display 110 does not match, the processor 140 may delay the decoded audio frame by a fourth time less than the first time, and transmit an audio frame delayed by the fourth time to the audio apparatus 200 through the communication interface 130.

In the embodiment described above, if the first time is 3 seconds instead of 1 second, in other words, time for the display apparatus 100 to decode the encoded video frame is 10 seconds, and time for the display apparatus 100 to decode the encoded audio frame is 5 seconds, the first time is 3 seconds, time taken to transmit the audio frame delayed by the first time from the display apparatus 100 to the audio apparatus 200 is 1 second, and time at which the audio frame transmitted from the display apparatus 100 is decoded by the audio apparatus 200 is 2 seconds, the audio apparatus 200 might not synchronize the video frame delayed by 10 seconds, even if a delayed time is set as 0, since the audio apparatus 200 outputs an audio frame delayed by 11 seconds through a speaker. So, the processor 140 may synchronize the video frame outputted from the display apparatus 100 and the audio frame outputted from the audio apparatus 200 by changing and setting the first time set to 3 seconds to the fourth time less than thereof such as 1 second.

The decoding time of the encoded video frame may be changed in real time according to a mode of the display apparatus 100 or a quality of image data. For example, when the mode of the display apparatus 100 is changed from a first mode (e.g., low quality mode, game mode, etc.) to a second mode (e.g., high-definition mode, movie watching mode, etc.), the decoding time of the video frame may be longer than before.

There may be a synchronization mismatch between the video frame outputted through the display 110 and the audio frame outputted from the audio apparatus 200. There may also be a synchronization mismatch between the video frame outputted through the display 110 and the audio frame outputted from a speaker of the display apparatus 100.

To address the above, the processor 140 may synchronize the audio frame output from the audio apparatus 200 with the video frame output through the display 110 based on the information on the second time. For example, the processor 140 may synchronize the audio frame output from the audio apparatus 200 with the video frame output through the display 110 by changing the first time described above based on the information on the second time.

For example, when the decoding time of the video frame is changed, the processor 140 may change the first time based on the changed decoding time of the video frame, time for the display apparatus 100 to decode the audio frame, and the second time. The changed first time may be determined based on total time of the changed decoding time of the video frame, the time for the display apparatus to decode the audio frame, and the second time. For example, if the changed decoding time of the video frame is 11 seconds, the time to decode the audio frame is 5 seconds, and the second time is 4 seconds, the processor 140 may identify 2 seconds as a new first time.

The processor 140 may delay the audio frame by the changed first time. A target to be delayed may be a decoded audio frame output by an audio decoder of the display apparatus 100. In addition, the processor 140 may transmit the audio frame delayed by the changed first time to the audio apparatus 200. In other words, when time taken to decode an audio frame in which the display apparatus 100 is encoded, and the changed first time is 2 seconds, the processor 140 may transmit the audio frame delayed by 7 seconds to the audio apparatus 200.

As described above, when the audio frame delayed by the first time is received from the display apparatus 100, the audio apparatus 200 may output the audio frame further delayed by the second time through a speaker.

In other words, as described above, if the second time is 4 seconds and the audio frame delayed by 7 seconds is received from the display apparatus 100, the audio apparatus 200 may output the audio frame delayed by 11 seconds.

Accordingly, the video frame output delayed by 11 seconds through the display 110 and the audio frame output from the audio apparatus 200 may be synchronized.

As described above, when the first time is changed by the display apparatus 100, the video frame output through the display 110 and the audio frame output from the audio apparatus 200 may be synchronized. Accordingly, after transmitting the information on the second time to the display apparatus 100, even if the decoding time of the video decoder is changed, the audio apparatus 200 might not need to perform a separate calculation to delay output of the audio frame. Further, after the information on the second time is received from the audio apparatus 200, even if the decoding time of the video decoder is changed, the display apparatus 100 may transmit the audio frame delayed by the changed first time to the audio apparatus 200, and might not need to transmit the decoding time of the changed video frame, the decoding time of the audio frame, and the information on the changed first time. Accordingly, the disclosure has an effect of reducing a computational burden of the display apparatus 100 and reducing power consumption due to data transmission and reception between the display apparatus 100 and the audio apparatus 200.

Figure 3:
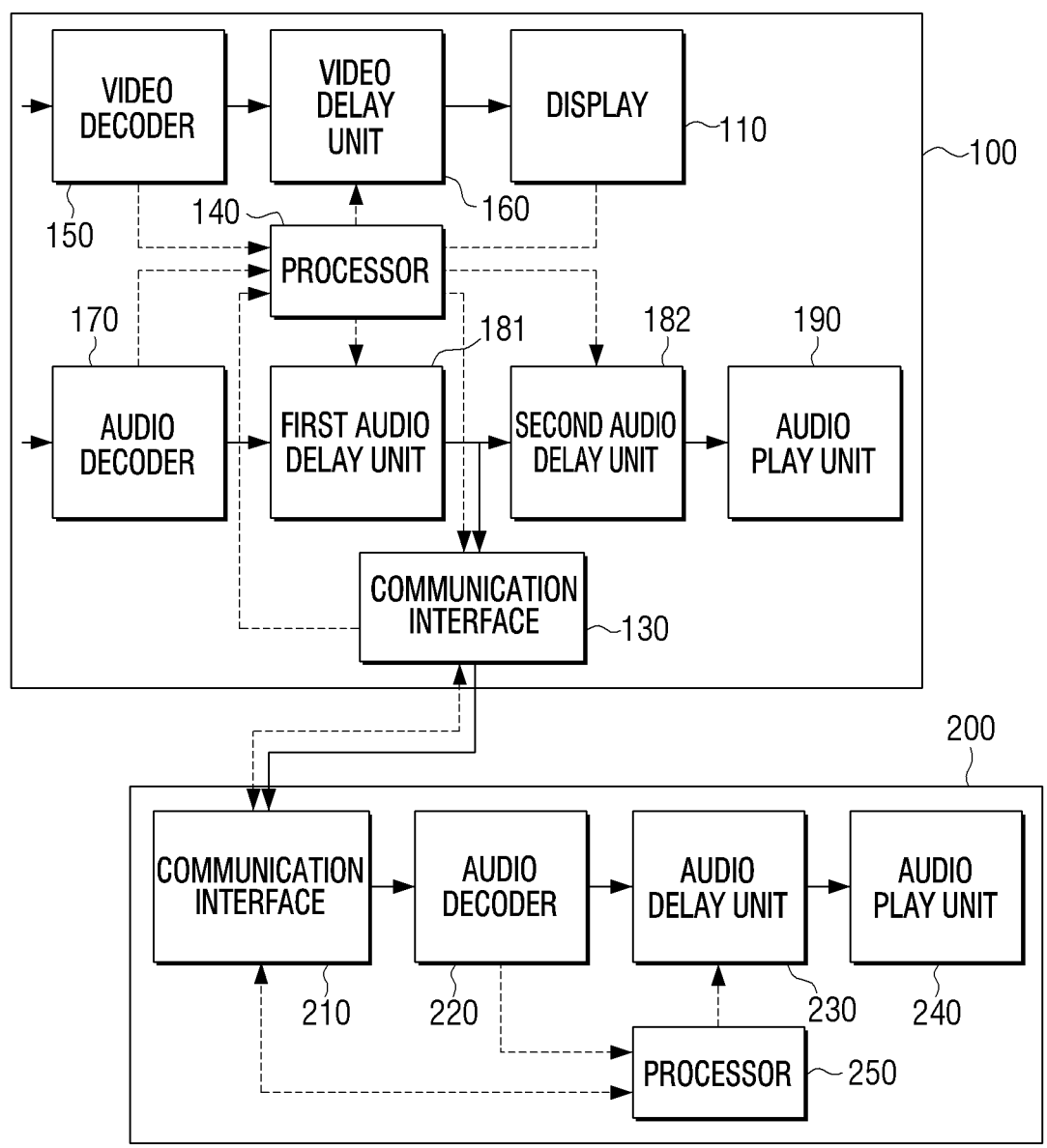
FIG. 3 is a block diagram illustrating an electronic system including a display apparatus and an audio apparatus.

FIG. 3 is a block diagram illustrating an electronic system including a display apparatus and an audio apparatus.

Referring to FIG. 3, an electronic system 1000 according to an embodiment includes a display apparatus 100 and an audio apparatus 200.

The display apparatus 100 may include a display 110, a communication interface 130, a video decoder 150, a video delay unit 160, an audio decoder 170, a first audio delay unit 181, a second audio delay unit 182, an audio play unit 190 and a processor 140. In addition, although not illustrated in FIG. 3, the display apparatus 100 may further include a receiver for receiving the encoded video frame and audio frame.

The audio apparatus 200 may include a communication interface 210, an audio decoder 220, an audio delay unit 230, an audio play unit 240, and a processor 250.

Hereinafter, parts overlapping with the above description may be omitted or abbreviated.

The video delay unit 160 may delay the output time of the decoded video frame.

For example, when time at which the video decoder 150 decodes the encoded video frame is faster than time at which the audio decoder 170 decodes the encoded audio frame, the processor 140 may set the first time in which the first audio delay unit 181 delays the decoded audio frame to 0. For example, when decoding the video frame with a low quality, the time for the video decoder to decode a video frame may be faster than the time for the audio decoder to decode an audio frame.

The processor 140 may identify time to synchronize the audio frame outputted through a speaker of the audio apparatus 200 and the video frame outputted through the display 110. For example, the processor 140 may identify a difference between the decoding time of the video frame in which the video decoder 150 is encoded, and a total time of time at which the audio decoder 170 decodes the encoded audio frame, and a second time identified based on information received from the audio apparatus 200, as a time for synchronization.

For example, if time taken to decode a video frame in which the video decoder 150 is encoded is 8 seconds, time taken to decode an audio frame in which the audio decoder 170 is encoded is 5 seconds, and the second time is 4 seconds, the processor 140 may identify the time for synchronizing the audio frame output from the audio apparatus 200 and the video frame output through the display 110 as 1 second.

Further, the processor 140 may control the video delay unit 160 to output the video frame by delaying by the identified time. Accordingly, the audio frame output through the speaker of the audio apparatus 200 and the video frame output through the display 110 may be synchronized.

The first audio delay unit 181 may delay the output time of the decoded audio frame based on the first time. For example, the first audio delay unit 181 may delay and output the decoded audio frame by the first time.

The audio frame delayed by the first time output from the first audio delay unit 181 may be transmitted to the audio apparatus 200 through the communication interface 130. For example, the processor 140 may encode the audio frame delayed by the first time, and transmit the audio frame delayed by the encoded first time to the audio apparatus 200.

In addition, as described above, the processor 140 may transmit the information on the decoding time of the video frame, the information on the decoding time of the audio frame, and the information on the first time to the audio apparatus 200.

The audio apparatus 200 may receive the information on the decoding time of the video frame, the information on the decoding time of the audio frame, the information on the first time, and the audio apparatus delayed by the first time.

When the audio frame delayed by the first time is received from the display apparatus 100, the processor 250 of the audio apparatus 200 may identify time taken to transmit the audio frame delayed by the first time from the display apparatus 100 to the audio apparatus 200.

Then, the processor 250 of the audio apparatus 200 may decode the audio frame delayed by the first time through the audio decoder 220, and identify the time taken to decode the audio frame delayed by the first time by the audio decoder 220.

The processor 250 of the audio apparatus 200 may further delay the audio frame decoded by the audio decoder 220 by the third time based on information on the decoding time of the video frame received from the display apparatus 100. For example, the processor 250 may identify a difference between the time at which the video decoder 150 decodes the encoded video frame, and the total time of the time at which the audio decoder 170 decodes the encoded audio frame, the first time, the time at which the audio delayed by the first time is transmitted from the display apparatus 100 to the audio apparatus 200, and the time at which the audio decoder 220 decodes the audio frame delayed by the first time, as a third time, and further delay the audio frame decoded by the audio decoder 220 by the third time.

In addition, the processor 250 of the audio apparatus 200 may output the audio frame further delayed by the third time through the audio play unit 240. The audio play unit 240 may be implemented as a speaker or the like.

A processor 250 of the audio apparatus 200 may transmit information on the second time to the display apparatus 100 through the communication interface 210. As described above, the information on the second time may include information on the delayed time in the audio apparatus 200 to output the audio frame.

When information on the second time is received from the audio apparatus 200, the processor 140 may set the second time as a delay time of a second audio delay unit 182. Accordingly, the audio frame delayed by the first time may be further delayed by the second time by the second audio delay unit 182, and the audio frame further delayed by the second time may be output through the audio play unit 190 of the display apparatus 100.

Thereafter, when the decoding time of the video frame is changed, the processor 140 may change the first time set to the first audio delay unit 181 based on the changed decoding time of the video frame, the time at which the display apparatus 100 decodes the audio frame, and the first time set to the first audio delay unit 181 based on the second time. The changed first time may be determined based on the difference in time. A delay time of the second audio delay unit 182 maintains the second time described above.

In addition, the processor 140 may transmit the audio frame delayed by the first time changed by the first audio delay unit 1810 to the audio apparatus 200 through the communication interface 130.

When the audio frame delayed by the changed first time is received, the processor 250 of the audio apparatus 200 may output the audio frame further delayed by the third time described above through the audio delay unit 230. The audio frame output by the audio play unit 240 may be an audio frame delayed by a total time of the time taken to decode the audio frame in which the audio decoder 170 is encoded, a first time delayed by a first audio delay unit 1810, time at which an audio frame output by the first audio delay unit 1810 is transmitted to the communication interface 210 of the audio apparatus 200, time at which the audio decoder 220 decodes the encoded audio frame, the third time delayed by the audio delay unit 230. The total time corresponds to the time for a video decoder 150 to decode an encoded video frame, so a synchronization of a video frame outputted through the display 110 and an audio frame outputted through the audio play unit 240.

Figure 4:
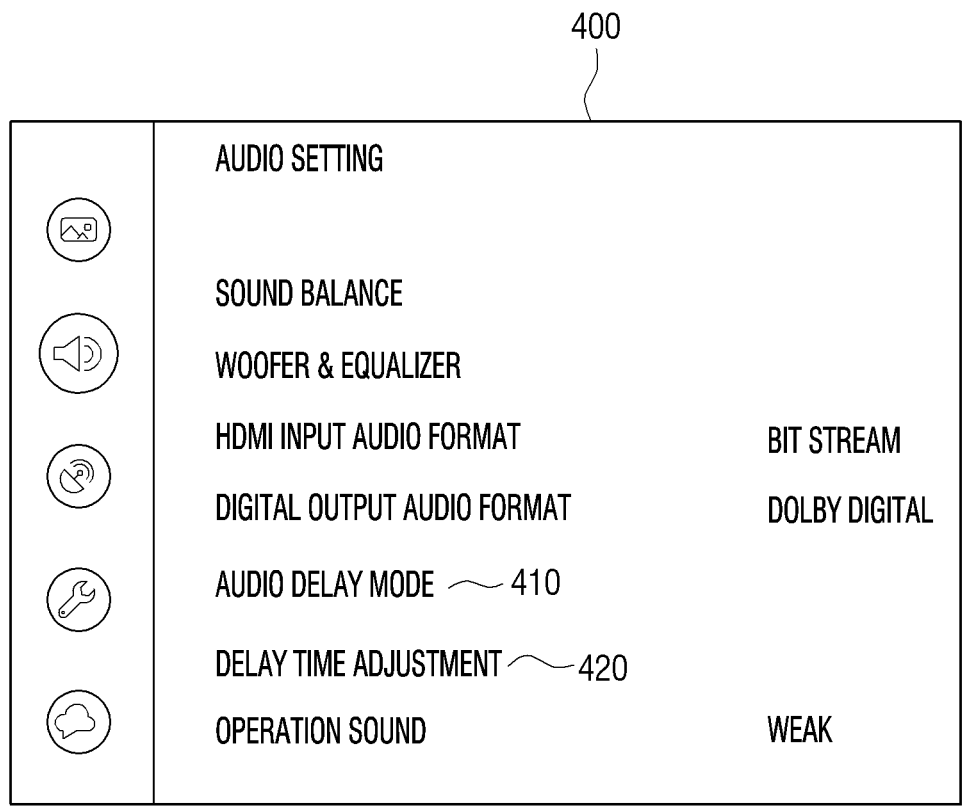
FIG. 4 is a view illustrating an audio setting screen according to an embodiment.
Figure 5:
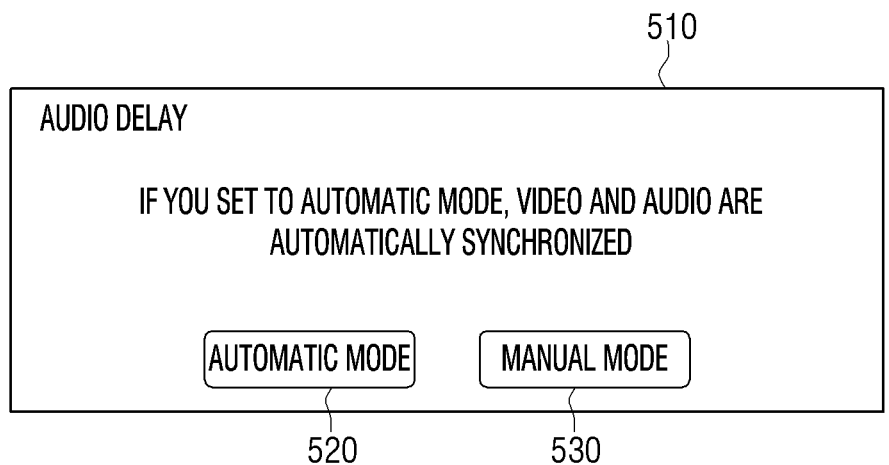
FIG. 5 is a view illustrating a screen for setting an audio delay mode according to an embodiment.
Figure 6:
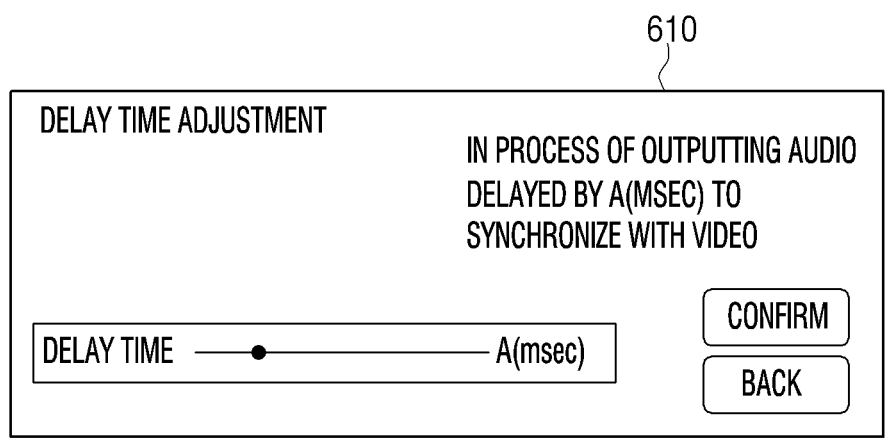
FIG. 6 is a view illustrating a screen provided in an automatic mode according to an embodiment.
Figure 7:
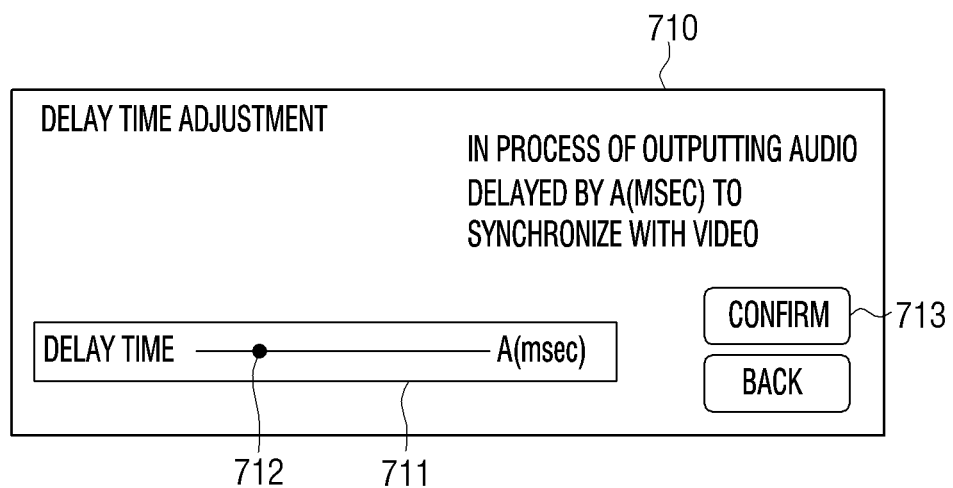
FIG. 7 is a diagram illustrating a screen provided in a manual mode according to an embodiment.

FIG. 4 is a view illustrating an audio setting screen according to an embodiment. FIG. 5 is a view illustrating a screen for setting an audio delay mode according to an embodiment. FIG. 6 is a view illustrating a screen provided in an automatic mode according to an embodiment. FIG. 7 is a diagram illustrating a screen provided in a manual mode according to an embodiment.

Referring to FIG. 4, the processor 140 may control the display 110 to display the audio setting screen 400. For example, when a user command for setting an audio frame output from the display apparatus 100 and/or an audio frame output from the audio apparatus 200 is received, the processor 140 may display the audio setting screen 400 through the display 110.

The audio setting screen 400 may include various menus. For example, referring to FIG. 4, the audio setting screen 400 may include a menu 410 for setting an audio delay mode and a menu 420 for adjusting an audio delay time. This is only an example, and the audio setting screen 400 may include the menu 410 for setting an audio delay mode, and the menu 420 for adjusting an audio delay time in a sub-menu of the menu 410 for setting the audio delay mode.

When a user command to select the menu 410 for setting an audio delay mode of FIG. 4 is received, the processor 140 may display a screen 510 to set the audio delay mode as shown in FIG. 5. The screen 510 to set the audio delay mode may include a message such as "When the automatic mode is set, videos and audios are automatically synchronized". Even when there is no user input, the manual mode may refer to a mode for synchronizing the video frame output through the display 110 and the audio frame output through a speaker of the audio apparatus 200, and the manual mode may refer to a mode for delaying an output time of the audio frame output through the speaker of the audio apparatus 200.

Even when a user command that selects a manual mode 530 is received on screen 510 to set the audio delay mode, the processor 140 may automatically change the first time based on decoding time of a video frame, decoding time of an audio frame, and the second time.

When the audio delay mode is set to the automatic mode (reference numeral 520), if the user command to select the menu 420 for adjusting the delay time of FIG. 4 is received, the processor 140 may display a screen as illustrated in FIG. 6. According to the embodiment, the menu for adjusting a delay time may be referred to as a synchronization menu.

Referring to FIG. 6, the processor 140 may display a screen 610 indicating that an audio frame is being output through the display 110 based on the first time. The first time may refer to a first time changed according to a change in decoding time of a video frame. For example, if the first time is A (msec), as illustrated in FIG. 6, the processor 140 may display a message such as "In the process of outputting an audio delayed by A(msec) time for synchronization with the image" and a bar including information A(msec). The screen illustrated in FIG. 6 is only an example, and any one of the message and the bar may be omitted, and other UIs, icons, or the like may be further included.

When the user command to select the manual mode is received on the screen 510 for setting the audio delay mode of FIG. 5, the processor 140 may adjust the output time of the audio frame according to the user command.

When the audio delay mode is set to the manual mode, if a user command to select the menu 420 for adjusting the delay time of FIG. 4 is received, the processor 140 may display a screen 710 for manually setting an output time of the audio frame through the display 110. The displayed screen 710 may include a menu for adjusting information on the first time and output time of the audio frame. In addition, the first time may refer to a first time changed according to a change in decoding time of a video frame. For example, if the first time is A (msec), as illustrated in FIG. 7, the processor 140 may display a message such as "A delay of audio output is required by A (msec) time for synchronization with the image", a bar 711 displaying a user interface (UI) 712 at a location corresponding to the A (msec), and a menu 713 that can adjust the output time of the audio frame. The screen illustrated in FIG. 7 is only an example, and any one of the message and the bar may be omitted, and other UIs, icons, or the like may be further included.

When the user command to select the menu 713 is received, the processor 140 may synchronize the audio frame output from the audio apparatus 200 with the video frame output through the display 110 based on the first time. In other words, when the user command for selecting the menu 713 is received, the processor 140 may delay the output time of the audio frame by the first time through the first audio delay unit, thereby synchronizing the video frame output through the display 110 and the audio frame output through the audio apparatus 200.

Figure 8:
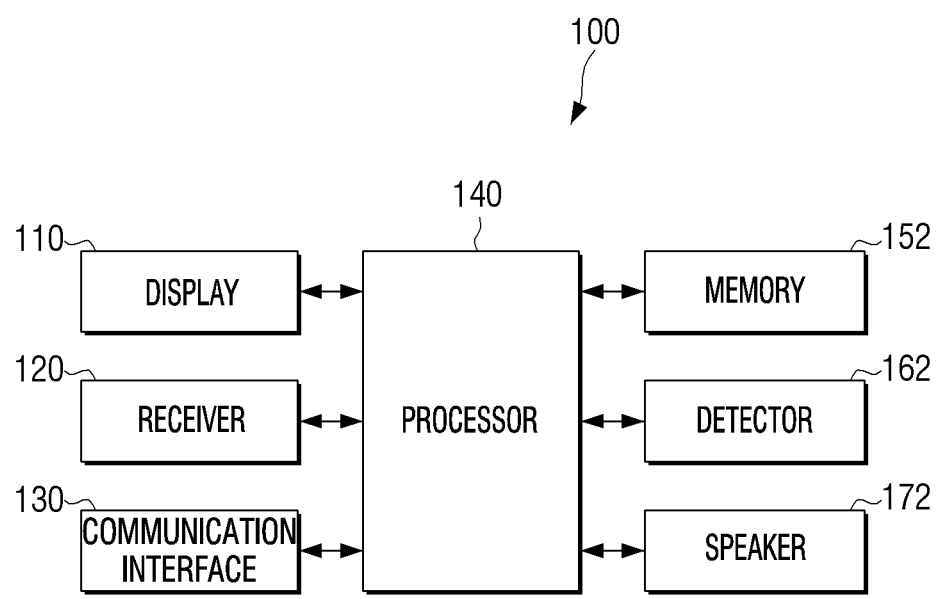
FIG. 8 is a block diagram illustrating a display apparatus according to an embodiment.

FIG. 8 is a block diagram illustrating a display apparatus according to an embodiment.

Referring to FIG. 8, the display apparatus 100 according to the embodiment may include a display 110, a receiver 120, a communication interface 130, a memory 152, a sensor 162, i.e., a detector, a speaker 172, and a processor 140. Hereinafter, parts where overlapping with the descriptions above may be abbreviated or omitted.

The memory 152 may store various modules to operate the display apparatus 100. For example, software that includes a base module, a sensing module, a communication module, a presentation module, a web browser module, and a service module, or the like, may be stored on the memory 152. In this case, the base module refers to a basic module which processes a signal transmitted from the hardware included in the display apparatus 100, and transmits the processed signal to an upper layer module. The sensing module may collect information from various sensors and may analyze and manage the collected information. The sensing module may include a face recognizing module, an audio recognizing module, a motion recognizing module, an NFC recognizing module, and the like. The presentation module may configure a display screen and may include a multimedia module for playing and outputting multimedia contents and a UI rendering module for performing UI and graphic processing. The communication module may perform communication with external devices. The web browser module may perform web browsing to access a web server. The service module may include various applications to provide various services.

The sensor 162 may be implemented as various sensors for sensing a user command. The sensor 162 may include a touch sensor.

The speaker 172 may output an audio frame decoded by an audio decoder. In addition, the speaker 172 may output various alarm sounds or voice messages. According to an embodiment, the speaker 172 may output a video frame displayed on the display 110 and an audio frame synchronized with an audio frame output from the audio apparatus 200.

The processor 140 may delay the decoded audio frame by the first time, and transmit information on the decoding time of the decoded audio frame, information on the first time, and the audio frame delayed by the first time to the audio apparatus 200. The first time may be a predetermined time, and may be determined based on a difference between decoding time of the video frame and decoding time of an audio frame.

The processor 140 may receive information on a second time delayed from the audio apparatus 200 to output the audio frame from the audio apparatus 200. The second time may refer to a total time of the time at which the audio frame is transmitted from the display apparatus 100 to the audio apparatus 200, the time at which the audio frame is decoded in the audio apparatus 200, and a third time delayed by the audio delay unit of the audio apparatus 200.

The processor 140 may synchronize the audio frame output from the audio apparatus 200 with the video frame output through the display 110 based on the information on the second time.

Although not illustrated in FIG. 8, the display apparatus 100 may further include a microphone. The processor 140 may synchronize a video frame displayed on the display 110 and an audio frame output from the audio apparatus 200 when a user voice for playing an image is received through a microphone.

Figure 9:
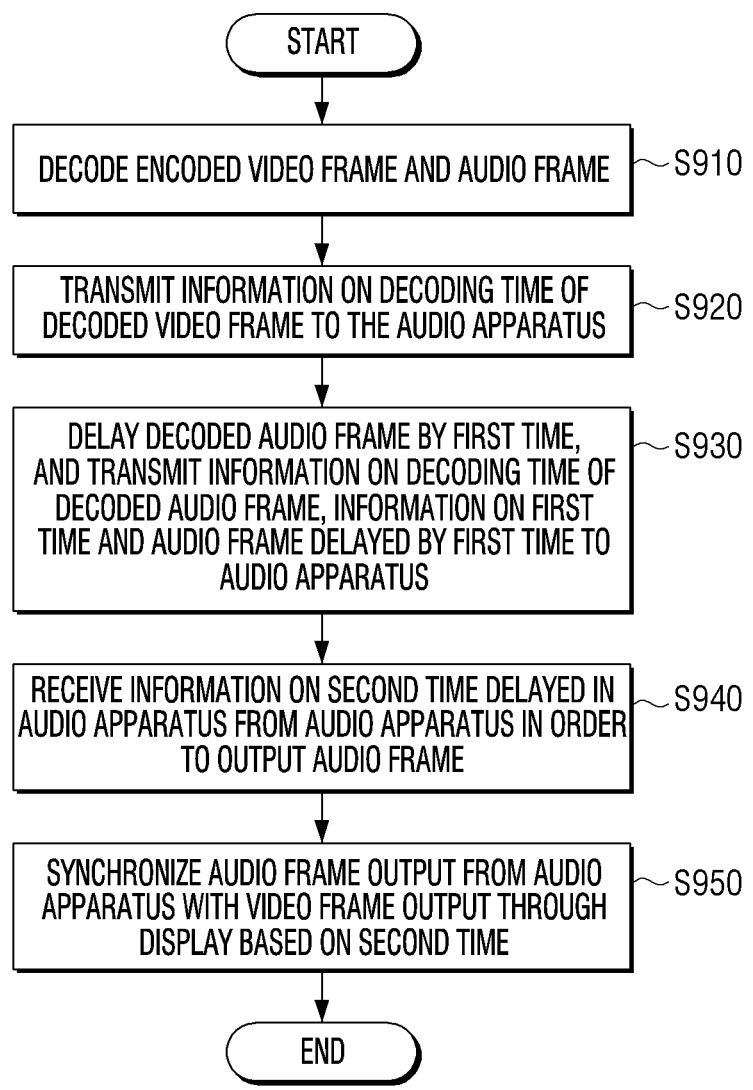
FIG. 9 is a flowchart illustrating a method of controlling a display apparatus according to an embodiment.

FIG. 9 is a flowchart illustrating a method of controlling a display apparatus according to an embodiment.

The display apparatus 100 may decode the encoded video frame and audio frame (S910). For example, the display apparatus 100 may decode a video frame through a video decoder and decode an audio frame through an audio decoder.

The display apparatus 100 may transmit information on decoding time of the decoded video frame to the audio apparatus (S920).

The display apparatus 100 may delay the decoded audio frame by the first time, and transmit information on the decoding time of the decoded audio frame, information on the first time, and the audio frame delayed by the first time to the audio apparatus (S930). The first time may refer to a predetermined time, and may be determined based on a difference between the decoding time of the video frame and the decoding time of the audio frame.

The display apparatus 100 may receive information on the second time delayed in the audio apparatus in order to output the audio frame from the audio apparatus (S940). The second time may be a total time of the time at which the audio frame is transmitted from the display apparatus 100 to the audio apparatus 200, the time that the audio frame is decoded in the audio apparatus 200, and a third time delayed by an audio delay unit of the audio apparatus 200.

The display apparatus 100 may synchronize the audio frame output from the audio apparatus with the video frame output through the display based on the information on the second time (S950).

When the decoding time of the video is changed, the display apparatus 100 may synchronize the audio frame output from the audio apparatus with the video frame output through the display by changing the first time.

According to various embodiments of the disclosure as described above, a display apparatus capable of automatically synchronizing a video frame output from a display apparatus and an audio frame output from an audio apparatus and a control method thereof may be provided.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

A non-transitory computer readable medium in which a program sequentially performing the controlling method according to the disclosure is stored may be provided.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a USB, a memory card, a read only memory (ROM), and the like, and may be provided.

While embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:
   a display;
   a communication interface;
   a receiver; and
   a processor configured to:
   decode an encoded video frame and an encoded audio frame, received through the receiver,
   transmit information on decoding time of the decoded video frame to an audio apparatus through the communication interface,
   delay the decoded audio frame by a first time, and transmit information on decoding time of the decoded audio frame, information on the first time, and a re-encoded audio frame delayed by the first time to the audio apparatus through the communication interface,
   in response to the transmitting the information on the decoding time of the decoded audio frame, the information on the first time, and the re-encoded audio frame, receive information on a second time delayed in the audio apparatus to output an audio frame from the audio apparatus through the communication interface, and synchronize the audio frame output from the audio apparatus with a video frame output via the display based on the information on the second time.

2. The display apparatus of claim 1, wherein the processor is configured to, in response to a change of the decoding time of the video frame, change the first time based on the changed decoding time of the video frame, the decoding time of the audio frame, and the second time, and transmit the re-encoded audio frame delayed by the changed first time to the audio apparatus.

3. The display apparatus of claim 1, further comprising: a first audio delay unit; and
a second audio delay unit,
wherein the processor is configured to set the first time to delay time of the first audio delay unit, and set the second time to delay time of the second audio delay unit, and, based on the first time being changed as the decoding time of the video frame changes, set the delay time of the first audio delay unit to the changed first time, and maintain the delay time of the second audio delay unit as the second time.

4. The display apparatus of claim 1, wherein the information on the second time includes time at which the audio frame delayed by the first time is transmitted from the display apparatus to the audio apparatus, time at which the transmitted re-encoded audio frame is decoded by the audio apparatus, and information on a third time delayed by an audio delay unit of the audio apparatus.

5. The display apparatus of claim 1, wherein the audio frame is configured to be delayed by the second time by the audio apparatus and outputted from the audio apparatus.

6. The display apparatus of claim 1, wherein the processor is configured to, based on the audio frame output from the audio apparatus and the video frame output via the display being not synchronized, delay the decoded audio frame by four times less than the first time, and transmit the audio frame delayed by the four times to the audio apparatus through the communication interface.

7. The display apparatus of claim 1, further comprising a video delay unit,
wherein the processor is configured to, based on the decoding time of the decoded video frame being faster than the decoding time of the decoded audio frame, set the first time to 0, identify time to synchronize the audio frame output from the audio apparatus and the video frame output via the display based on information on the decoding time of the decoded audio frame and information on the second time received from the audio apparatus, and control the video delay unit to output the video frame by delaying the video frame by the identified time.

8. The display apparatus of claim 2, wherein the processor is configured to, based on a user command for selecting a synchronization menu being received, control the display to display a screen indicating that the audio frame is being output based on the changed first time.

9. The display apparatus of claim 2, wherein the processor is configured to, based on a user command for selecting a synchronization menu being received, display information on the changed first time and a menu for adjusting output time of the audio frame, and based on a user command in the menu for adjusting output time of the audio frame being received, synchronize the audio frame output from the audio apparatus with the video frame output via the display based on the changed first time.

10. A method of controlling a display apparatus comprising: decoding an encoded video frame and an encoded audio frame,
transmitting information on decoding time of the decoded video frame to an audio apparatus;
delaying the decoded audio frame by a first time;
transmitting information on decoding time of the decoded audio frame, information on the first time, and a re-encoded audio frame delayed by the first time to the audio apparatus;
in response to the transmitting the information on the decoding time of the decoded audio frame, the information on the first time, and the re-encoded audio frame, receiving information on a second time delayed in the audio apparatus to output an audio frame from the audio apparatus; and
synchronizing the audio frame output from the audio apparatus with a video frame output via the display apparatus based on the information on the second time.

11. The method of claim 10, further comprising, in response to a change of the decoding time of the video frame, changing the first time based on the changed decoding time of the video frame, the decoding time of the audio frame, and the second time, and transmitting the re-encoded audio frame delayed by the changed first time to the audio apparatus.

12. The method of claim 10, further comprising:
setting the first time to delay time of a first audio delay unit of the display apparatus, and setting the second time to delay time of a second audio delay unit of the display apparatus; and
based on the first time being changed as the decoding time of the video frame changes, setting the delay time of the first audio delay unit to the changed first time, and maintaining the delay time of the second audio delay unit as the second time.

13. The method of claim 10, wherein the information on the second time includes time at which the audio frame delayed by the first time is transmitted from the display apparatus to the audio apparatus, time at which the transmitted re-encoded audio frame is decoded by the audio apparatus, and information on a third time delayed by an audio delay unit of the audio apparatus.

14. The method of claim 10, wherein the audio frame is configured to be delayed by the second time by the audio apparatus and outputted from the audio apparatus.

15. The method of claim 10, further comprising, based on the audio frame output from the audio apparatus and the video frame output via the display apparatus being not synchronized, delaying the decoded audio frame by four times less than the first time, and transmitting the audio frame delayed by the four times to the audio apparatus.

16. The method of claim 10, further comprising, based on the decoding time of the decoded video frame being faster than the decoding time of the decoded audio frame, set the first time to 0, identify time to synchronize the audio frame output from the audio apparatus and the video frame output via the display apparatus based on information on the decoding time of the decoded audio frame and information on the second time received from the audio apparatus, and control a video delay unit of the display apparatus to output the video frame by delaying the video frame by the identified time.

17. The method of claim 11, further comprising, based on a user command for selecting a synchronization menu being received, displaying a screen indicating that the audio frame is being output based on the changed first time.

18. The method of claim 11, further comprising, based on a user command for selecting a synchronization menu being received, displaying information on the changed first time and a menu for adjusting output time of the audio frame, and based on a user command in the menu for adjusting output time of the audio frame being received, synchronizing the audio frame output from the audio apparatus with the video frame output via the display apparatus based on the changed first time.

* * * * *